March 19, 1963 T. SAPINO 3,081,940

ELECTRICAL MONITORING AND CONTROL APPARATUS

Filed March 28, 1958 2 Sheets-Sheet 1

INVENTOR.
THEODORE SAPINO

BY Henry L. Hanson

ATTORNEY

ELECTRICAL MONITORING AND CONTROL APPARATUS

Filed March 28, 1958 2 Sheets-Sheet 2

INVENTOR.
THEODORE SAPINO

BY Henry L. Hanson
ATTORNEY

United States Patent Office 3,081,940

Patented Mar. 19, 1963

3,081,940
ELECTRICAL MONITORING AND CONTROL APPARATUS

Theodore Sapino, Framingham, Mass., assignor to Minneapolis-Honeywell Regulator Company, Minneapolis, Minn., a corporation of Delaware Filed Mar. 28, 1958, Ser. No. 724,554
6 Claims. (Cl. 235—61.11)

Figure 1:
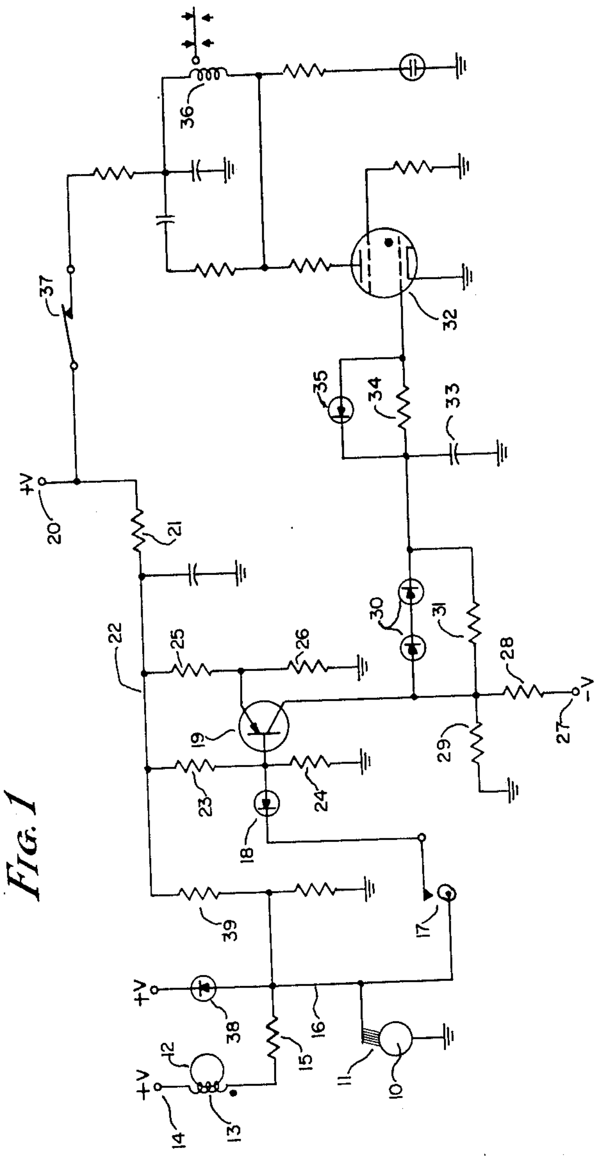

A general object of the present invention is to provide a new and improved apparatus for monitoring the operation of a tabulating card feeding mechanism. More specifically, the present invention is concerned with a new and improved apparatus for sensing the presence or absence of tabulating cards in a feed mechanism and also for checking the cards fed through the mechanism to see if they are skewed wherein this apparatus is characterized by its ability to function in a circuit combination with card reading apparatus which incorporates magnetic core storage elements in the associated circuitry.

Tabulating cards of the punched type are widely used in conveying of information in a form in which it may be readily accepted and sensed by electromechanical means. In one such card reading apparatus, it has been found desirable that the punches or holes in the tabulating cards be read directly into suitable bistable magnetic core elements in the course of a normal reading operation. This is conveniently accomplished by utilizing the sensing brush, which is adapted to pass through the holes of the tabulating card, to close an electrical circuit by way of contacting a grounding element on the other side of the card. The closing of this circuit will establish a current flow in a winding which is adapted to set a bistable magnetic core. Once the core has been set, the information may be shifted therefrom into suitable utilization circuits by means well known in the art. In such tabulating card apparatus, it is desirable that a check be made to determine if a card is actually present at a reading station at some particular time during the course of a reading operation. It is further necessary that a check be made to determine if the card is in skew or not. In other words, if the card is not aligned with respect to the reading brushes at the reading station, it is desired that this fact be known by the operator and, if desired, that the card feeding apparatus be stopped. It has been found desirable, in order to minimize the amount of equipment required, that the missing card circuit and/or the card skew circuits use the normal brush sensing elements at the card reading station, these elements being normally used in the reading of the holes in the card.

In order to effect the desired sensing and monitoring of the cards by the same brushes, a new circuit has been provided, as hereinafter set forth, for utilizing the sensing brushes at predetermined times during each card cycle for sensing and for monitoring. The monitoring circuitry utilized has been devised so that it will not be adversely affected by the presence of a magnetic core circuit which may also be directly connected to the card reading brushes.

It is, therefore, a further more specific object of the present invention to provide a new and improved monitoring circuit for a tabulating card reading apparatus wherein the monitoring circuit may be used directly in conjunction with a magnetic core setting element and magnetic core circuit without the core setting element, the magnetic core circuit, or the monitoring circuit interfering with the operation of the other.

It has been found that the present circuit may be used to produce the desired operating features by incorporating a unique combination of timing switches and a transistor circuit which is capable of operating at impedance levels comparable to the impedance levels found in a magnetic core circuit without the impedances of either circuit being adversely affected by the other in the course of a normal card reading cycle. In this regard it has been found desirable for a transistor circuit to be provided wherein the transistor of the circuit functions as a switch which is normally biased to be nonconductive in the absence of a condition indicating faulty operation. If a condition should exist at the card reading station indicating that there is a faulty operation, it is desired that the transistor be swiched into conduction.

It is, therefore, a further more specific object of the present invention to provide a new and improved monitoring circuit for a card feeding apparatus which incorporates a transistor element normally arranged to be nonconducting and adapted to be biased into a conducting region upon the sensing of a condition at the card feed mechanism indicating faulty operation.

Insofar as monitoring the presence or absence of a card from the reading station at the card feed mechanism, it is necessary that a sensing be made at a predetermined time in each card cycle at a selected hole sensing brush location, preferably a location at the center of the leading edge of the card. In the case of a skew detection circuit, the monitoring circuit is preferably arranged to co-operate with at least two sensing brushes at the reading station where the two brushes are relatively widely separated insofar as reading data from the card is concerned. In this latter case, the monitoring circuit is arranged so that the signals from the two brushes used in the monitoring operation are buffered together to produce a control signal capable of switching a transistor into a conductive state. The presence of a skew condition is checked during the interval immediately following the time that a tabulating card would normally have left a reading station.

A still further more specific object of the invention is then to provide a new and improved monitoring circuit for a card feeding apparatus which incorporates a transistor switching device normally biased to be non-conductive and which is adapted to be rendered conductive by the presence of a signal from a single reading brush in the case of a missing card circuit, or by a pair of reading brushes in the case of a skew detection circuit.

Another object of the invention is to provide a new and improved coupling circuit for a thyratron control circuit which is adapted to be driven by the control transistor of the present apparatus wherein the coupling circuit will prevent the unwanted firing of the thyratron when power is switched onto the plate circuit thereof.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 2:
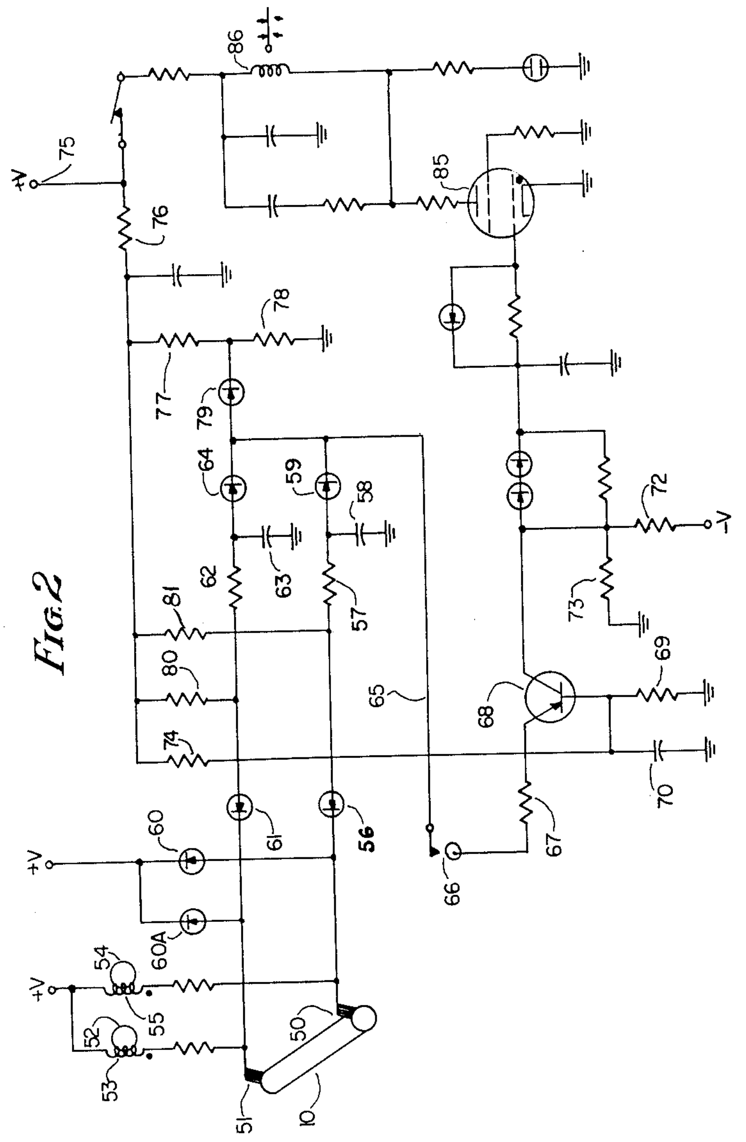

Of the drawings:

FIGURE 1 is a schematic representation of a missing card detection and monitoring circuit; and FIGURE 2 is a schematic showing of a circuit useful in the detecting of the presence of a skew in a card at a card reading station.

Referring to FIGURE 1, there is here illustrated a circuit for sensing the fact that a card may be missing from a card reading station at a time when a reading operation is normally about to take place. This circuit is so arranged that it will, in the absence of a card, cause a control signal to switch a transistor to a conductive state and thereby cause a thyratron relay circuit to be activated.

When the card is present, the circuit will not fire the thyratron relay circuit.

Considering FIGURE 1 more specifically, the numeral 10 identifies a conducting roller which is adapted to co-operate with reading brushes for tabulating cards normally used with this apparatus. These cards will pass over the roller 10 and move the co-operating brushes away from the roller to open the electrical circuits associated therewith, unless there are holes in the card. Shown in FIGURE 1 is a single brush 11. The brush 11 will normally be aligned with one of the columns on a tabulating card which is adapted to pass through the reading station. In the present circuit, the brush 11 is adapted to be used for measuring the presence or absence of a card and is preferably a brush located at about the middle of all of the brushes in any one reading station. Thus, in a card reading station having eighty brushes for an eighty column tabulating card, the brush 11 might well be used for sensing in column 40.

Associated with the brush 11 is a suitable digital storage element shown as a bistable magnetic core 12. The core 12 has a winding 13 which is adapted to be connected in a closed electrical circuit including a voltage source terminal 14 by way of a resistor 15, brush 11, and the grounded drum 10.

In the normal card reading operation, the presence of a hole in a particular column, such as the column 40 wherein the brush 11 is located, will cause a closing of the electrical circuit through the winding 13 and therefore a signal will be written into the core 12. When a signal is so written into the core 12, it may then be shifted out into suitable utilization circuitry as is known in the art.

A further lead 16 is coupled to the brush 11 and this lead 16 connects the brush to the missing card sensing circuit of the present invention. The lead 16 couples to a cam operated switch 17 and to a diode 18, the latter of which is connected to the input of a base electrode of a transistor 19, the latter also including suitable emitter and collector electrodes. The operating voltages for the transistor 19 are derived from a plus voltage supply terminal 20 which passes by way of a resistor 21 to a distribution lead 22. The base of the transistor 19 is biased to be slightly positive by reason of a connection to this lead 22. The connecting circuit therefor includes a pair of series connected resistors 23 and 24 with the base being connected to the junction between the resistors 23 and 24.

A bias is supplied for the emitter of the transistor 19 by way of a further pair of resistors 25 and 26 which are also connected to the supply lead 22.

The collector of the transistor 19 is connected to a separate negative voltage supply terminal 27, and a voltage divided network including a pair of resistors 28 and 29. The voltage supplies for the transistor 19 are such that the base thereof is biased to be slightly positive with respect to the emitter by approximately one volt. The magnitude of the voltage required is, of course, dependent upon the particular type of transistor which may be used in the circuit. When the base of this transistor is biased to be slightly positive, the emitter-collector current path will be of relatively high impedance and consequently substantially no current will be flowing therein.

The collector of the transistor 19 is coupled by way of a pair of series connected diodes 30, and a resistor 31 connected in parallel therewith, to the input circuit of the thyratron 32. The input circuit comprises a condenser 33 which functions as a filter condenser and a resistor 34, the latter having a diode 35 connected in parallel therewith. The thyratron 32 is adapted, when triggered to fire, to supply the necessary current for activating an output indicating relay 36. Once the circuit has fired, it is adapted to remain in the conducting state until such time as an operator opens a switch 37 which is in series with the plate circuit of the thyratron 32.

If desired, a diode 38 may be coupled to the lead 16 and a plus voltage terminal to clamp the lead to a predetermined voltage. The effect of this is to prevent any kickback voltage from the core 12 from damaging the sensing circuits if the cam switch 17 should be closed.

In considering the over-all operation of the circuit of FIGURE 1, consideration is first given to the normal card reading cycle of the apparatus. By definition, a card cycle may be considered in terms of degrees with 360 degrees defining a complete card cycle. If the apparatus is operating properly, the normal timing for the leading edge of a card to arrive at the reading station will be at the 355½ degree position in the cycle. In a normal tabulating card having holes punched therein, there is a certain distance from the leading edge before the first row on the card where a punch may appear is reached. Thus, a sensing may be made on this leading edge to determine if in fact the card has arrived at the reading station. The sensing is conveniently accomplished at some time in the card cycle after 355½ degrees and a 9 degree position where the first row of information normally reaches the brush.

In the present circuit, the cam 17 is arranged to be operated for a 6 degree interval starting at 359 degrees and continuing until 5 degrees have passed in the card cycle. During that time, the switch 17 will be closed and will be connecting the brush 11 directly to the diode 18 on the input to the base of the transistor 19. If the card is present in the circuit, there will be no alteration of the electrical condition existing on the base of the transistor 19 and consequently the circuit will remain nonconducting. However, when the switch 17 is closed, and if the card has not reached the brush 11, or is absent from the feed mechanism, the brush 11 will engage the surface of the drum 10 and a ground circuit will be completed from the base of the transistor 19, through the diode 18, switch 17, lead 16, and brush 11. The grounding of the base by this circuit is effective to cause the base of the transistor to be negative with respect to the emitter thereof and consequently the transistor will be rendered conducting. When the transistor becomes conducting, the collector thereof will be substantially grounded and this grounding signal will be reflected through the diodes 30 and will cause a voltage to appear on the grid of the thyratron 32 to fire the same. When the thyratron fires, it will cause current to flow through the relay 36 and the relay will operate its output contacts to provide a suitable indication and/or control function in the card reader circuit.

Once the card has moved beyond the 9 degree position in the card cycle, it will then be sensed in the normal manner by the brush 11 and such other brushes as are in position in the reading apparatus. In any position wherein there is a hole in the card, the current flowing through the brush as the brush engages the drum 10 will be effective to switch the core 12 and write an appropriate signal therein which may be transferred out to a suitable utilization circuit.

It will be apparent from the foregoing circuit that the apparatus is capable of operating to sense the presence or absence of the card at the start of the card cycle without necessitating the disconnection of the brush from the normal reading core circuitry. This is true even though the impedance of the magnetic core circuitry is relatively low. This novel arrangement of circuit elements considerably simplifies the circuitry required in this sensing circuit and greatly enhances the usefulness of the circuit insofar as speed of operation is concerned. In one embodiment of the invention, the cards were fed past the reading station at the rate of approximately 900 card per minute. Thus, the time to sense for a missing card is less than 1.5 milliseconds, which further points up the need for a circuit having a high speed of response.

It will be noted that the thyratron 32 has a special input circuit provided therefor in the form of the condenser 33, resistor 34, and diode 35. The presence of this circuit is to minimize the effect of spurious voltage signals from the output of the thyratron from affecting the input thereto. In this regard, it should be noted that closing of switch 37 in the plate circuit will result in a positive signal suddenly appearing at the plate of the thyratron. This positive signal tends to be coupled into the grid circuit by capacitive coupling. The diode 35, in co-operation with the condenser 33, tends to shunt the signal to ground and prevent the control grid from firing the thyratron. Thus, the circuit will be ready to sense the next sensing for a missing card and will not be triggered falsely by any transient signal on the plate thereof.

As each card progresses through the reading mechanism, it will normally leave the reading station at the 229 degree position. If a card is skewed more than a predetermined amount, one end of the card will leave the reading station before the other end does. If the card is skewed more than a predetermined amount, it is desired that the skew be detected and an appropriate signal be generated to inform the operator of this condition and/or stop the operation of the card feeding mechanism. In one embodiment of the invention, it was found desirable to check for skew at the 237 degree position of the card cycle. Thus, at the time of sensing, if any part of the card remains under reading brushes located near the ends of the card, then it is desired that a signal be generated indicating a skew condition.

The circuitry of FIGURE 2 is the circuitry used for detecting the presence of skew. As in the case of FIGURE 1, the brushes used for sensing the skew are also used in the normal reading of the card. Referring specifically to FIGURE 2, there are shown co-operating with the reading station drum 10 a pair of brushes 50 and 51. In the case of an eighty column card, the brushes which may be used for the skew detection should preferably be located near the ends of the cards. Thus, the brush 51 may well be the second brush associated with the second column of the card while the brush 50 may be the seventy-ninth brush associated with the seventy-ninth column on the card. Connected in circuit with the brush 51 is a suitable magnetic core element 52 having a control set winding 53 wound thereon. Connected in circuit with the brush 50 is a further core 54 having a winding 55 thereon.

The brush 50 is coupled by way of the diode 56 to an R.C. integrating circuit including resistor 57 and a condenser 58. This integrating circuit is coupled to a diode 59 which functions as a buffer diode in the present circuit. The brush 50 is clamped to a positive voltage by way of a clamping diode 60.

The brush 51 is coupled by way of a coupling diode 61 to a further integrating network comprising a resistor 62 and a condenser 63. The output of this integrating network is connected to a buffer diode 64. The buffer diodes 59 and 64 are in turn coupled to an output lead 65 which passes through a timing cam switch 66. A further clamp diode 60A is connected to the brush 51. The cam time switch 66 is adapted to be activated at the 237 degree position and will remain activated for a predetermined number of degrees thereafter and will open before the time that the next card would normally arrive at the sensing stations. The timing cam 66 is coupled by way of resistor 67 to the emitter of a transistor 68.

The transistor 68, in addition to the emitter, includes the normal base and collector electrodes. The transistor 68 is connected in the common base configuration with the base thereof being connected to ground by way of a resistor 69 having a condenser 70 in parallel therewith. The collector is connected to a minus voltage supply by way of a voltage divider network including a resistor 72 and a resistor 73. The base of the transistor is connected to a positive voltage source which includes a resistor 74 and leads to a plus voltage terminal 75 by way of a filter resistor 76. The voltage terminal 75 also supplies voltage to the buffer circuit by way of a pair of resistors 77 and 78 and a further diode 79, the latter of which is connected to the output lead 65 of the buffer circuit. A biasing voltage is also supplied by way of the plus supply terminal 75 and resistors 80 and 81, which are connected to the anodes of the diodes 61 and 56, respectively, on the input to the buffer circuit.

The output collector electrode of the transistor 68 is coupled in a manner similar to that of FIGURE 1 to a thyratron 85, the latter of which is adapted, when fired, to activate an appropriate relay 86 in the output circuit thereof.

In considering the operation of the circuit as disclosed in FIGURE 2, it should be kept in mind that in the normal reading operation, the brushes 50 and 51 will be functioning to sense holes in the cards as they pass over the drum 10. Thus, the presence of a hole in the cards will permit the closing of an electrical circuit for setting the associated cores.

As pointed out above, when the card has passed the reading station, it will normally have passed out from under the reading brushes at the 229 degree position of the card reading cycle. If the card is in skew such that a part of the card remains under one or the other of the brushes 50 and 51 at the 237 degree position of the card cycle, the closing of the switch 66 will be effective to cause a signal to appear on the emitter of the transistor 68. Thus, if the brush 50 should not be grounded due to the presence of a card between the brush and the drum 10 and the switch 66 closes, a signal will be applied from the plus voltage terminal 75 to the integrating network formed by the resistor 57 and condenser 58. The plus voltage will be effective to cause the diode 59 to conduct in the buffer circuit and therefore to couple a positive signal into the emitter of the transistor 68. With this positive signal on the emitter, and with the base effectively connected to ground, the transistor 68 will be rendered conducting in the emitter-collector path. This will cause the potential of the collector to approach ground potential and consequently the thyratron 85 will fire. The thyratron 85 will remain conducting, once it has fired, until such time as an operator opens the circuit in series with the plate thereof.

If the skew should be in the opposite direction such that the brush 51 has a card thereunder at the time that the timing cam 66 closes, the circuit will again function to cause the conduction of the transistor 68 through the other buffer diode 64 and thus the thyratron 85 will again be fired.

If the card is passing through the circuit in a normal manner, both of the brushes 50 and 51 will be engaging the drum 10. This will cause the grounding of the cathodes of the diodes 56 and 61 and consequently the grounding of the input leads to the integrating circuits formed by the R.C. networks on the input of the buffer diodes. This will means that the voltage condition on these diodes and thus on the emitter of the transistor 68 will not be materially disturbed so that the transistor 68 will remain nonconducting.

It will be noted that in this particular skew detection circuit the brushes 50 and 51, even though they are connected in circuit with magnetic core storage circuits, may nevertheless be used directly for sensing card skew. As with the missing card sensing circuit, this feature considerably enhances the use to which the circuit may be put and the speed with which it may be operated.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases certain features of the invention may be used to advantage without a corresponding use of other features.

Having now described the invention, what is claimed as new and novel and for which it is desired to secure Letters Patent is:

1. A checking circuit for a punched medium data reader comprising a sensing brush, a first sensing circuit including a magnetic core having a winding thereon, said magnetic core winding being directly connected to said brush and adapted to change the magnetic state of said core, a second sensing circuit connected to said brush, a timing switch connected in series with said second sensing circuit, and a transistor connected to said second sensing circuit, said transistor being switched to a saturated state upon the closing of said timing switch and upon the presence of a predetermined electrical condition at said sensing brush.

2. A checking circuit for a punched medium data reader comprising a sensing brush, a first sensing circuit including a magnetic core having a winding thereon, said magnetic core winding being directly connected to said brush and adapted to change the magnetic state of said core, a second sensing circuit connected to said brush, a timing switch connected in series with said second sensing circuit, a transistor normally biased to be nonconductive and having a base, emitter, and collector, means including said second sensing circuit connected to said base to ground said base upon the presence of a grounding signal from said brush to switch the emitter-collector path of said transistor to a conducting state when said timing switch closes, and indicating means connected to be controlled by said transistor.

3. A checking circuit for a punched medium data reader comprising a sensing brush, a first sensing circuit including a magnetic core having a winding thereon, said magnetic core winding being directly connected to said brush and adapted to change the magnetic state of said core, a second sensing circuit connected to said brush, a timing switch connected in series with said second sensing circuit, a transistor normally biased to be nonconductive and having a base, emitter and collector, means including said timing switch connecting said second sensing circuit to the base of said transistor to switch said transistor into the conducting state in the emitter-collector path of said transistor, and indicating means connected to be activated by said transistor when in the conducting state.

4. A monitor circuit for a tabulating card reader comprising a sensing brush adapted to engage a grounded surface in the absence of a tabulating card or upon the presence of a hole in a tabulating card, a bistable magnetic core circuit directly connected to said brush and adapted to be set by the presence of a grounding signal at said brush, a transistor circuit having an emitter-collector circuit, first bias means connected to said transistor to maintain said transistor effectively nonconducting in said emitter-collector circuit, a timing switch synchronously operated in connection with the sensing of tabulating cards, second bias means connected to said transistor, and means including said timing switch and said brush for effectively activating said second bias means to render said transistor conducting in said emitter-collector circuit upon the presence of a predetermined conducting condition at said brush.

5. A monitor circuit for a card feed apparatus comprising a conducting surface over which a card is adapted to be passed, a sensing brush adapted to engage said surface in the event no card is under the brush, a bistable magnetic core having a winding connected to said brush, a transistor having a base, emitter, and collector, means connecting said base, emitter, and collector to fixed potential bias points to maintain said transistor nonconducting in the emitter-collector circuit thereof, a timing switch adapted to be synchronized with the movement of cards through said feed apparatus, means including a diode coupling said transistor base to said timing switch, and means including said timing switch coupling said diode to said brush to switch said transistor to be conductive in the event said brush is engaging said conducting surface.

6. A monitor circuit for a card feed apparatus comprising a conducting surface over which a card is adapted to be passed, a sensing brush adapted to engage said surface in the event no card is under the brush, a bistable magnetic core having a winding connected to said brush, a transistor having a base, emitter, and collector, means connecting said base, emitter, and collector to fixed potential bias points to maintain said transistor nonconducting in the emitter-collector circuit thereof, a timing switch adapted to be synchronized with the movement of cards through said feed apparatus, means including a diode coupling said transistor base to said timing switch, means including said timing switch coupling said diode to said brush to switch said transistor to be conductive in the event said brush is engaging said conducting surface, and an indicating means connected to said transistor, said indicating means being adapted to be activated when said transistor is conducting in the emitter-collector circuit thereof.

References Cited in the file of this patent

UNITED STATES PATENTS

| | | |
|---|---|---|
| 2,517,131 | Phillipi et al. | Aug. 1, 1950 |
| 2,798,668 | Watkin | July 9, 1957 |
| 2,798,985 | Hansen | July 9, 1957 |
| 2,833,474 | Wilson et al. | May 6, 1958 |